(12) United States Patent
Chritz et al.

(10) Patent No.: US 11,893,398 B2
(45) Date of Patent: Feb. 6, 2024

(54) METHODS, SYSTEMS, AND APPARATUSES TO PERFORM A COMPUTE OPERATION ACCORDING TO A CONFIGURATION PACKET AND COMPARING THE RESULT TO DATA IN LOCAL MEMORY

(71) Applicant: MICRON TECHNOLOGY, INC., Boise, ID (US)

(72) Inventors: Jeremy Chritz, Seattle, WA (US); Tamara Schmitz, Scotts Valley, CA (US); Fa-Long Luo, San Jose, CA (US); David Hulton, Seattle, WA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 17 days.

(21) Appl. No.: 17/673,712

(22) Filed: Feb. 16, 2022

(65) Prior Publication Data

US 2022/0171634 A1 Jun. 2, 2022

Related U.S. Application Data

(62) Division of application No. 16/292,091, filed on Mar. 4, 2019, now Pat. No. 11,269,661.

(51) Int. Cl.
*G06F 9/38* (2018.01)
*G06F 9/448* (2018.01)
(Continued)

(52) U.S. Cl.
CPC .......... *G06F 9/4494* (2018.02); *G06F 9/3836* (2013.01); *G06F 9/3891* (2013.01);
(Continued)

(58) Field of Classification Search
CPC .... G06F 9/3836; G06F 9/3853; G06F 9/3891; G06F 15/825
See application file for complete search history.

(56) References Cited

U.S. PATENT DOCUMENTS 5,953,738 A 9/1999 Rao
6,282,632 B1 * 8/2001 Higaki ................ G06F 9/30094
712/42
(Continued)

FOREIGN PATENT DOCUMENTS

CN 108780434 A 11/2018

OTHER PUBLICATIONS

U.S. Appl. No. 16/292,091, titled "Data Flows in a Processor With a Data Flow Manager", filed Mar. 4, 2019, pp. all pages of the application as filed.

*Primary Examiner* — Jacob Petranek
(74) *Attorney, Agent, or Firm* — Dorsey & Whitney LLP

(57) ABSTRACT

Methods, apparatuses, and systems for implementing data flows in a processor are described herein. A data flow manager may be configured to generate a configuration packet for a compute operation based on status information regarding multiple processing elements of the processor. Accordingly, multiple processing elements of a processor may concurrently process data flows based on the configuration packet. For example, the multiple processing elements may implement a mapping of processing elements to memory, while also implementing identified paths, through the processor, for the data flows. After executing the compute operation at certain processing elements of the processor, the processing results may be provided. In speech signal processing operations, the processing results may be compared to phonemes to identify such components of human speech in the processing results. Once dynamically identified, the processing elements may continue comparing additional components of human speech to facilitate processing of an audio recording, for example.

16 Claims, 8 Drawing Sheets

(51) Int. Cl.
*G06F 12/0842* (2016.01)
*G06F 15/82* (2006.01)
*G06F 9/50* (2006.01)

(52) U.S. Cl.
CPC ........ *G06F 9/5027* (2013.01); *G06F 12/0842* (2013.01); *G06F 15/825* (2013.01)

(56) References Cited

U.S. PATENT DOCUMENTS

| | | | |
|---|---|---|---|
| 7,181,595 B1* | 2/2007 | Siska | G06F 9/3853 |
| | | | 712/24 |
| 8,990,543 B2* | 3/2015 | Codrescu | G06F 9/3826 |
| | | | 712/24 |
| 9,747,139 B1 | 8/2017 | Borlick et al. | |
| 11,269,661 B2 | 3/2022 | Chritz et al. | |
| 2002/0019928 A1* | 2/2002 | Saulsbury | G06F 9/3851 |
| | | | 712/E9.02 |
| 2005/0039185 A1 | 2/2005 | Heidari-bateni et al. | |
| 2007/0260895 A1 | 11/2007 | Aguilar et al. | |
| 2013/0067205 A1* | 3/2013 | Plondke | G06F 9/30072 |
| | | | 712/225 |
| 2014/0208331 A1 | 7/2014 | Li et al. | |
| 2016/0026507 A1 | 1/2016 | Muckle et al. | |
| 2018/0239641 A1 | 8/2018 | Kumar et al. | |
| 2020/0285486 A1 | 9/2020 | Chritz et al. | |

\* cited by examiner

METHODS, SYSTEMS, AND APPARATUSES TO PERFORM A COMPUTE OPERATION ACCORDING TO A CONFIGURATION PACKET AND COMPARING THE RESULT TO DATA IN LOCAL MEMORY

CROSS REFERENCE TO RELATED APPLICATION(S)

This application is a divisional of U.S. patent application Ser. No. 16/292,091 filed Mar. 4, 2019 and issued as U.S. Pat. No. 11,269,661 on Mar. 8, 2022. The aforementioned application, and issued patent, is incorporated herein by reference, in its entirety, for any purpose.

BACKGROUND

Digital signal processing for wireless communications, such as digital baseband processing or digital front-end implementations, may be implemented using some hardware (e.g., silicon) computing platforms. For example, multimedia processing and digital radio frequency (RF) processing may be accomplished in a digital front-end implementation of a wireless transceiver, as implemented by an application-specific integrated circuit (ASIC). A variety of hardware platforms may implement such digital signal processing, such as the ASIC, a digital signal processor (DSP) implemented as part of a field-programmable gate array (FPGA), or a system-on-chip (SoC). However, each of these solutions often requires implementing customized signal processing methods that are hardware implementation specific. For example, a digital signal processor may implement a specific portion of digital processing at a cellular base station, with individual hardware components (e.g., processors) being configured to implement specific functionalities. For example, each portion of the overall signal processing performed may be implemented by different, specially-designed hardware, creating complexity.

Moreover, there is interest in moving wireless communications to "fifth generation" (5G) systems. 5G offers promise of increased speed and ubiquity, but methodologies for processing 5G wireless communications have not yet been set. In some implementations of 5G wireless communications, "Internet of Things" (IoT) devices, which may operate with lower power requirements than traditional wireless communication devices, may utilize a narrowband wireless communication standard, which may be referred to as Narrow Band IoT (NB-IoT). For example, Release 13 of the 3GPP specification describes a narrowband wireless communication standard.

At the same time, high speed memory access, and reduced power consumption are features that are demanded from semiconductor devices. In recent years, systems that have adopted multi-core processors for the execution of applications have resulted in faster access patterns to a memory device serving as a main memory (e.g., dynamic random access memory (DRAM)) and also more random access patterns. For example, a typical access pattern to the DRAM repeats bank activation, read access or write access, and bank precharge in the order. Data flows to/from a memory device for faster access are needed. The efficiency and performance of a computing device may be affected by different memory device and/or the processor architecture. Accordingly, a need exists for fast and efficient access patterns to facilitate data flows in multi-core processors, for example.

DETAILED DESCRIPTION

Figure 1:
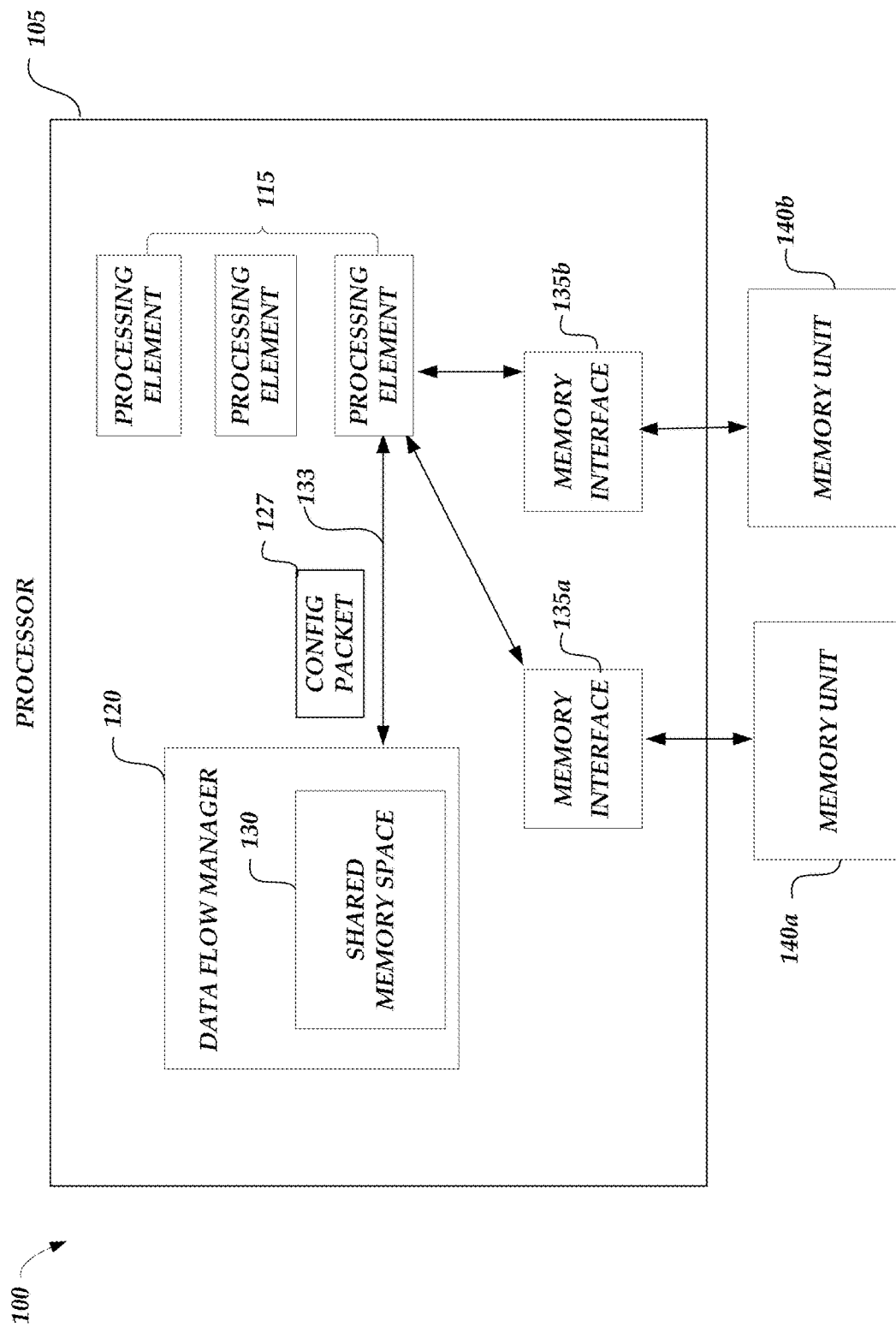
FIG. 1 is a block diagram of a computing system arranged in accordance with examples described herein.

Methods, apparatuses, and systems for implementing data flows in a processor are described herein. Multiple processing elements of a processor may concurrently process data flows. For example, the multiple processing elements may implement a mapping of processing elements to memory units and/or shared local memory, while also implementing identified paths, through the processor, for the data flows. A data flow manager, which may comprise a shared memory space, may be configured to generate a configuration packet for a compute operation based on status information regarding the multiple processing elements of the processor. The configuration packet includes data indicative of the mapping of processing elements and the identified data flows. In providing such configuration packets to certain processing elements of the processor, data flows in the processor may be implemented faster (e.g., faster access to memory) and may utilize less power than conventional schemes that are hardware implementation specific. For example, in executing a compute operation where a data flow manager has provided configuration packets to certain processing elements, the processor may access memory units that are physically closer to the processor, according to the identified data flows of the configuration packet. Or, as another example, the processor may utilize the shared memory space of the data flow manager to store and/or provide intermediate processing results to certain processing elements, as the compute operation is being executed; instead of, for example, storing the intermediate processing results in external memory units, which may require more power or more time to access.

As an example of a compute operation, data flows implemented in processors described herein may include data flows for speech signal processing applications, such as for processing individual phonemes of an utterance at each respective processing element of a subset.

As described herein, advantageously, compute operations being performed or implemented in certain processing elements of a processor or computing device, may include providing configuration packets, including data indicative of mappings and data flows, to those processing elements. In providing configuration packets to certain processing elements, a processor and/or computing device may efficiently utilize processing elements that are available and/or a reduced number of processing elements. Accordingly, in contrast to a conventional hardware scheme that may allocate certain processing elements to perform a specific functionality, the systems and method described herein may facilitate efficient and flexible processing of compute operations based on availability and physical locations of certain processing elements. Additionally or alternatively, such systems and methods may facilitate processing for IoT devices, which may operate with lower power requirements than traditional computing/communication devices. For example, with a data flow manager having selected a particular number of processing elements, a processor and/or computing device implementing a compute operation with the selected processing elements may utilize less power than a conventional processor that may be required to power processing elements that are not needed to implement that particular operation.

FIG. 1 is a schematic illustration of a computing system 100 arranged in accordance with examples described herein. The computing system 100 includes a processor 105 coupled to memory units 140a, 140b. The processor may implement a data flow manager 120 that includes a shared memory space 130. For example, the shared memory space 130 may be a SRAM memory unit. The data flow manager 120 provides configuration packets 127 via a control bus 133 to processing elements 115. The processing elements 115 may be coupled to the memory units 140a, 140b via memory interfaces 135a, 135b. For example, such a coupling may be implemented via a data bus of the processor 105. The processor 105 may implement compute operations received from various data sources or processes being executed on the processor 105. Compute operations may be any operand processing operation, such as those that occur frequently in digital signal processing operations (e.g., a speech signal processing operation). For example, compute operations may require operand processing units to process certain operands to generate processing results for the compute operations. As an example, a compute operation may include operand multiplication and/or operand addition. Multiple such operand operations may be cascaded together to perform more complex signal processing operations, or compute operations, such as filtering, equalization, transformations, matrix computations, etc. Accordingly, the data flow manager 120, in order to perform such compute operations with processing elements 115, each having operand processing units, provides configuration packets 127 to the processing elements 115, with a mapping and identified data flows to access one or more of the memory units 140a, 140b and perform any number of compute operations.

The processor 105 may perform the compute operations utilizing the generated configuration packets 127 of the data flow manager 120. In various examples, the processor 105 may be a multi-core processor in some examples that includes a plurality of cores. The plurality of cores may for example be implemented using the processing elements 115 which read and execute program instructions independently. For example, the program instructions may be provided to individual processing elements 115 to implement a compute operation, with each processing element 115 storing the instructions in a cache associated with the respective processing element 115. In some examples, each processing element 115 may include a cache (e.g., a SRAM unit) to store the retrieve the program instructions for the compute operation.

The data flow manager 120 may provide the configuration packets 127 to the processing elements 115 to instruct the processing elements how to implement a compute operation utilizing a memory system that may be outside of the processor 105, e.g., via a data bus from the processor 105 to a memory system. For example, the data flow manager 120 may provide data indicative of a mapping of addresses of the processing elements 115 to respective addresses of the memory units 140a, 140b in a configuration packet(s) 127. The data flow manager 120 may, for example, provide such configuration packets 127 to the processing elements 115 before execution of a compute operation. In some examples, the processing elements 115 may retrieve data from addresses of the shared memory space 130, rather than the memory units 140a, 140b. The mapping included in the configuration packet 127 may be utilized to implement a compute operation, such as a speech signal processing operation, as described in methods herein, for example the method 400.

Each of the processing elements 115 may be implemented using one or more operand processing units, such as an arithmetic logic unit (ALU), a bit manipulation unit, a multiplication unit, an accumulation unit, an adder unit, a look-up table unit, a memory look-up unit, or any combination thereof. In some examples, each of the processing elements 115 may include circuitry, including custom circuitry, and/or firmware for performing compute operations. Each of the processing elements 115 can be implemented as a microprocessor or a digital signal processor (DSP), or any combination thereof. For example, each of the processing elements 115 can include levels of caching, such as a level one cache and a level two cache, a core, and registers. The processing elements 115 may receive and/or transmit data from the memory units 140a, 140b or the shared memory space 130. For example, the shared memory space 130 may be accessible by any of the processing elements 115, for example, to access data to be processed in a compute operation. In some examples, the shared memory space 130 may be local cache of the data flow manager 120. Additionally, each of the processing elements 115 may comprise a buffer configured to transmit data for the compute operation based on the instructions to be executed, for that respective processing element 115, provided in the configuration packet. Examples of processing elements 115 with operand processing units and transmit buffers are described with respect to FIG. 2 and FIGS. 5A-5B.

While the example of FIG. 1 depicts three processing elements 115, it can be expected that any number of processing elements 115 may be included in the processor 105 to interact with the data manager 120. For example, the number of processing elements 115 may be one, two, three, four five, ten, twenty, fifty, or another number of processing elements 115. Generally, any portion or all of the processing elements 115 may be selected by the data manager 120 to implement a compute operation.

Generally described, to generate the configuration packet 127, the data flow manager 120 selects a subset of the multiple processing elements 115 based on status information that indicates a status of each the processing elements 115. The status information may include an availability status of each processing elements 115 and a physical location of each processing element 115. Processing elements 115, in the processor 105, may have varying availability status based on its processing capability or scheduled processes. For example, a processing element 115 may have an available status, a reserved status, a partial availability status, or a nonfunctional status. Based on such status information, the data flow manager 120 selects a subset of the multiple processing elements for a particular compute operation. In order to select the subset of the processing elements 115, the data flow manager 120 identifies, in the status information, locations of each processing element 115, for example, in reference to one of the memory units 140, 140b. Such locations of each processing element 115 may be physical locations or relative locations. Relative locations may be in reference to another processing element 115, in reference to a particular memory unit 140a or 140b, or in reference to any element of the computing system 100. In such an instance, the data flow manager 120 may determine a physical distance to both the memory unit 140a and memory unit 140b from each processing element 115. Using the physical distances, the data flow manager 120 may determine that a particular processing element may be able to receive data from and/or provide data to a particular memory unit faster than another processing element which may be further away. Advantageously, processing elements 115 may be selected for use in a compute operation based on their distance from memory units involved in storing data used in, or resulting from the compute operation.

The data flow manager 120 also identifies, in the status information, an availability status of each processing element 115. Having identified the respective location (e.g., a relative location) and availability statuses of each processing element 115, the data flow manager 120 selects, for the compute operation, a subset of the processing elements 115 on the identified relative locations and/or availability statuses. For example, the data flow manager 120 may use a combination of a physical or relative distance from a particular processing element and an availability status (e.g., the processing element 115 having a partial availability at one of its operand processing units) to select a certain processing element 115 as part of a subset of processing elements 115. In an example, the data flow manager 120 may select a group of processing elements 115 that are physically closest to the shared memory space 130 and at least partially available. Accordingly, that selected group of processing elements may be said to be relatively located closer to the shared memory space 130 than other processing elements. As another example, the data flow manager 120 may also select a first group of processing elements that are physically closest to the memory unit 140b and available; while also selecting some processing elements that are not part of the first group, as a second group, with those processing elements being closest to the shared memory space 130 and available. Both the first and second groups of processing elements may form the subset for the compute operation. Accordingly, the data flow manager 120 may utilize a variety of rules and/or prioritizations to select a subset of processing elements 115.

Having selected the subset, the data flow manager 120 may also identify a plurality of data flows, to implement the compute operation. A data flow specifies which respective processing element 115 of the selected subset of processing elements 115 is to retrieve and/or access data from shared memory space 130 or an external memory unit 140a, 140b. For example, a certain processing element 115 may be connected directly (e.g., by a wire trace) to memory unit 140b. If a compute operation is to process data stored in memory unit 140b, the data flow manager 120 may identify the connection between that certain processing element 115 and the memory unit 140b as a data flow for that compute operation. The identified plurality of data flows may be used to implement the compute operation for which the data flow manager 120 generated the configuration packet 127. For example, an identified data flow may route data to/from a specific processing element 115 that is physically closer to one of the memory units 140a, 140b, than other processing elements, where that data is to be stored/accessed. In some examples, in order to identify the plurality of data flows to each processing element 115 of the subset, the data flow manager 120 calculates a plurality of transmission times from memory units 140a, 140b to each processing element 115 of the subset. Based on such transmission times, the data flow manager 120 determines that use of a particular portion of the transmission times reduce a compute time of the compute operation. That particular portion of the transmission times (e.g., to reduce the compute time) may be identified by the data flow manager 120 as the identified data flow of the plurality of data flows. Each identified data flow may be associated with the corresponding, calculated transmission time. Advantageously, in identifying such data flows, the processor 105 may perform compute operations faster than conventional schemes that may rely on using fixed routes to elements of a processor to perform a compute operation.

The selected processing elements 115—the subset of the processing elements—implement the plurality of data flows according to a mapping provided in the configuration packet 127. To generate the mapping, the data flow manager 120 maps an address of each processing element 115 of the subset to a respective memory address, e.g., a memory address of an external memory unit(s) 140a, 140b or a memory address of the shared memory space 130 of the data flow manager 120. Accordingly, the mapping includes data indicative of an address of a processing element 115 that is mapped to a memory address, such that the processing element 115 may utilize the mapping to access data to perform compute operations. For example, the memory units 140a, 140b and/or the shared memory space 130 may be configured to store data for the compute operation. The data flow manager 120 may dynamically reconfigure mappings for further compute operations, thereby advantageously facilitating a flexible use of processing elements 115 among various compute operations to be implemented by the processor 105. For example, while implementing a first compute operation, the data flow manager may generate a mapping that maps addresses of the processing elements 115 to the memory unit 140 to acquire certain data; and, in a subsequent, second compute operation, the data flow manager 120 may map addresses of the shared memory space 130 to the processing elements 115. In this example, the shared memory space 130 may store the intermediate processing results of the first compute operation generated by the subset of the processing elements 115. Accordingly, for the second compute operation, the data flow manager 120 may determine data flows among the processing elements 115 to re-route data traffic to the shared memory space 130; rather than having stored the intermediate processing results in the memory unit 140a, which could require additional transmission time and would have increased compute time of the second compute operation.

Upon execution of the instructions provided in the configuration packet 127 for implementing a compute operation, the processing elements 115 may interact with the memory interfaces 135a, 135b to provide commands to implement the compute operation, as well as any clock signals, command signals, and/or an address signals to any of the memory units 140a, 140b. For example, the respective peripheral circuit region of the memory units 140a, 140b may include clock terminals, address terminals, command terminals, and data input/output (I/O) terminals (DQ). For example, the data I/O terminals may handle eight-bit data communication. Data input output (I/O) buffers may be coupled to the data input/output terminals (DQ) for data accesses, such as read accesses and write accesses of memories. The address terminals may receive address signals and bank address signals. The bank address signals may be used for selecting a bank among the plurality of banks. A row address and a column address may be provided as address signals. The command terminals may include a chip select (/CS) pin, a row address strobe (/RAS) pin, a column address strobe (/CAS) pin, a write enable (/WE) pin, and/or the like. A command decoder may decode command signals received at the command terminals from the memory controller 110 via one of the memory interfaces 135a, 135, to receive various commands including a read command and/or a write command. Such a command decoder may provide the control signals corresponding to the received commands to control the memory cell array region. The clock terminals may be supplied with an external clock signal, for example from one of the memory interfaces 135a, 135.

While the example of FIG. 1 depicts two memory units 140a, 140b, it can be expected that the processing elements 115 may interact with any number of memory units. For example, eight memory units may be included and each memory unit may include a data bus having an eight-bit width, thus a memory system accessed by the processor 105 may have a sixty-four bit width. The memory units 140a, 140b may be static random-access memory (SRAM), dynamic random-access memory (DRAM), or nonvolatile random-access memory (RAM), such as ferroelectric RAM (FeRAM), spin-transfer-torque RAM (STT-RAM), phase-change RAM (PCRAM), resistance change RAM (Re-RAM), a 3D XPoint memory, or the like. In some examples, memory units 140a and 140b may be varying types of RAM, such as Graphics DDR SDRAM (GDDR SDRAM) or may be varying types of three-dimensional Ram, such as RAM that may interact with an HBM interface. In an example, memory unit 140a may include a 3D-stacked DRAM that interacts with the memory interface 135a that is implemented as an HBM interface; and the memory unit 140b may be a GDDR SRAM unit that interacts with the memory interface 135b. In various embodiments, such memory units may be referred to as memory chips, memory modules, memory dies, memory cards, memory devices, memory arrays, and/or memory cells. Physically, the memory units 140a, 140b may be arranged and disposed as one layer, or may be disposed as stacked layers. In some embodiment, the memory units 140a, 140b may be disposed as multiple layers, on top of each other, to form vertical memory, such as 3D NAND Flash memory.

Figure 2:
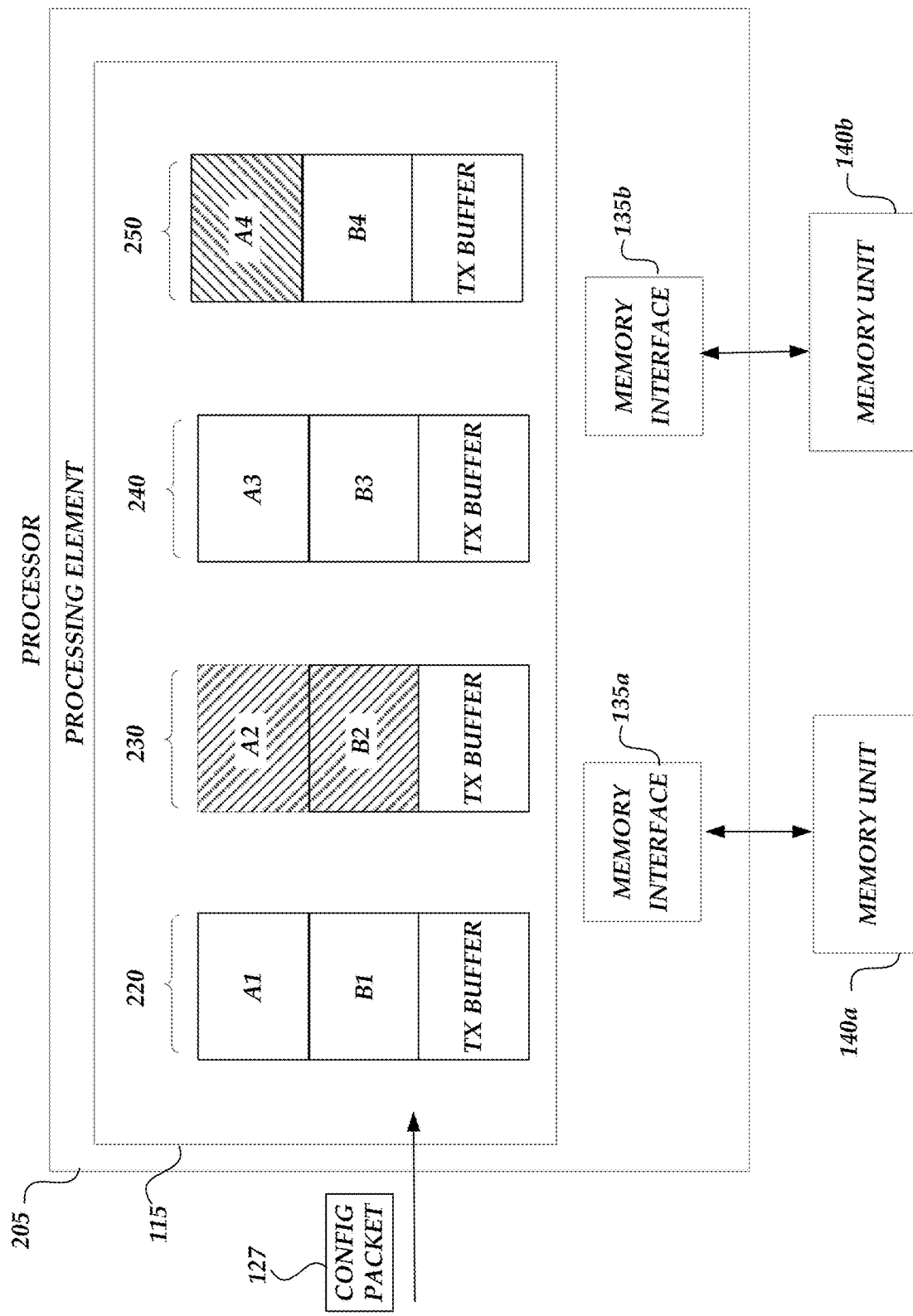
FIG. 2 is a block diagram of a processor arranged in accordance with the example of FIG. 1.

FIG. 2 is a block diagram of a processor 205 arranged in accordance with the example of FIG. 1. For example, the processor 205 may be implemented as the processor 104 in the example of FIG. 2. Similarly described elements of FIG. 2 may operate as described with respect to FIG. 1, but may also include additional features as described with respect to FIG. 2. For example, FIG. 2 depicts a single processing element 115 of the processing elements 115 of FIG. 1 to describe additional features that processing elements 115 may include. Such features may also be implemented in the processing elements 115 of FIG. 1, such that the description of the single processing element 115 in FIG. 2 is interchangeable as a processing element as implemented throughout the examples described herein. Therefore, it can be appreciated that, while referring to a single processing element 115 in FIG. 2, the processor 205 may have multiple processing elements 115, like FIG. 1, to also have the same features as described with respect a single processing element.

Processing element 115 of the processor 205 includes groups 220, 230, 240, and 250 of operand processing units. Each processing element 115 may have a groups of operand processing units to perform different operand processing operations. For example, a group of operand processing units may be configured together to perform a multiply-accumulate operation to an operand; while another group of operand processing units may be configured to perform a more complex operand operation, such as a filtering operation. In some examples, a processing element 115 may represent a specific digital signal processing functionality, which it performs by using each group of operand processing units. In an example, the groups of operand processing units may each represent a compute operation to perform a low-pass filtering operation, which may require both a group of operand processing units performing a filtering operation and at least another group performing a multiplication operation.

The group 220 of operand processing units includes an A1 operand processing unit, a B1 operand processing unit, and a transmit (TX) buffer. Similarly, the group 240 of operand processing units includes an A3 operand processing unit, a B3 operand processing unit, and a transmit buffer. Generally, the data flow manager 120 may provide a configuration packet 127 having a mapping that includes data indicative of certain addresses of the operand processing units. The mapping may specify which operand processing units are to retrieve and/or access data from a memory address. Additionally, the configuration packet 127 may include instructions for a portion of the compute operation. For example, based on the instructions included in the configuration packet 127, the processing element 115 may be configured to compute a portion of compute operation using the A1 and A3 operand processing units. While the data indicative of the addresses for A1 and A3 may point to a start of a compute operation, information in the configuration packet 127 may also indicate that B1 and B3, respectively, are to be utilized in the compute operation after processing of data at A1 and A3, respectively.

Having received instructions for a compute operation via the configuration packet 127, the operand processing units A1, B1, A3, and B3 may execute instructions to perform the compute operation in accordance with configuration packet 127. For example, the configuration packet 127 may include data indicating that the processing element 115 is a part of a subset to perform the compute operation. In such an instance, upon execution of the instructions at the operand processing units A1, B1, A3, and B3, processing results may be generated, e.g., the output of the A3 and B3. Such processing results may be stored in a respective transmit buffer of the groups 220 and 240, respectively. The processing results stored in the transmit buffers may be stored there based on the configuration packet 127 indicating such storage at the processing element 115. Once stored, the processing results may be utilized by other processing elements 115, e.g., if the same configuration packet 127 or another configuration packet 127 indicates that such processing results are to be utilized in a subsequent compute operation or to be written to memory units 140a, 140b or a shared memory space of a data flow manager (e.g., the shared memory space 130 of the data flow manager 120).

In some examples, providing the configuration packet 127 may occur while instructions are being executed on certain other operand processing units. In the example of FIG. 2, the group 230 of operand processing units 230 includes an A3 operand processing unit, a B3 operand processing unit, and a transmit buffer, where the A3 and B3 operand processing units have a reserved status indicative of those operand processing units either being utilized in an ongoing operation (e.g., instructions being executed) or reserved for a future compute operation. Because each of the groups of operand processing units 220, 230, 240 may receive and execute varying instructions from a data flow manager 120, the processing element 115 may be referred to as reconfigurable, thereby allowing the processor 205 to be referred to as a reconfigurable hardware platform.

A reconfigurable hardware platform, such as a reconfigurable processor 205 may change and/or update instructions sent to certain processing elements 115. Some groups of operand processing units on the reconfigurable processor 205 (e.g., the group 230) may be executing or performing a certain functionality, such as adding or accumulating; and other operand processing units (e.g., the groups 220 and 240) may be reconfigured to receive different instructions that may alter or change their respective functionalities. For example, the groups 220 and 240 may receive instructions in the configuration packet 127, as such instructions may be associated with one or more addresses of the operand processing units A1, B1, A3, or B3. Such advantages related to the dynamic provision of instructions to the processing elements 115 through a configuration packet 127 may lead to faster processing time of a reconfigurable processor 205 over a conventional ASIC or a specially-configured DSP unit.

As noted with respect to FIG. 1, the operand processing units of the processing element 115 may be a multiplication unit or an accumulation unit. For example, the operand processing units of group 220 may include multiple multipliers, multiple accumulation unit, or and/or multiple adders, e.g., as implemented using an ALU. In some examples, A1 may be a multiplication unit and A2 an accumulation unit, which can include a respective multiplier and a respective adder that each perform, respectively, multiplications and additions. The input-output relationship of A1 and A2 being implemented as a multiplication and accumulation unit may be represented as:

$$B_{out} = \sum_{i=1}^{I} C_i * B_{in}(i) \quad (1)$$

where "I" represents a number to perform the multiplications in that unit, $C_i$ the coefficients which may be accessed from a memory, such as memory unit 140a, and $B_{in}(i)$ represents the input data, as provided to be accessed in the configuration packet, e.g., through a mapping of an address of A1 to a memory address, e.g., an address in the shared memory space 130 or an output from another operand processing unit, e.g., the transmit buffer of group 240. In an example, the output of a set of multiplication unit/accumulation units, $B_{out}$, equals the sum of coefficient data, $C_i$ multiplied by the output of another set of multiplication unit/accumulation units, $B_{in}(i)$. Accordingly, in summing the products, $B_{out}$ represents the accumulation of A1 and A2 being implemented as a multiplication and accumulation unit. $B_{in}(i)$ may also be the input data such that the output of a set of multiplication unit/accumulation units, $B_{out}$, equals the sum of coefficient data, $C_i$ multiplied by the input data.

While the example of FIG. 2 depicts two operand processing units for each group 220, 230, 240, and 250, it can be expected that any number of operand processing units may be included in the processing element 115. For example, the number of operand processing units may be one, two, three, four five, ten, twenty, fifty, or another number of processing elements 115. Generally, any portion or all of the operand processing units may implement a compute operation.

A data flow manager, such as the data flow manager 120 of FIG. 1, may request and examine the status of the operand processing units in groups 220, 230, 240, or 250 of the processing element 115 shown in FIG. 2. For example, to generate the configuration packet 127, as described herein, a data flow manager selects a subset of the multiple processing elements 115 based on status information that indicates a status of each the processing elements 115, e.g., a status of a processing element to perform a compute operation for which the data flow manager is generating a configuration packet 127. In some example, the status information may also include a status of individual groups 220, 230, 240, and 250, and/or an overall status of individual processing element 115. For example, the groups 220 and 240 may have an available status, due to their respective operand processing units A1, B1, A3, and B3 being available; while the group 230 may have a reserved status, due to the A2 and B2 being reserved (as indicated in FIG. 2 with vertical hatching); and while group 250 may have a partial availability status, due to the operand processing unit A4 being nonfunctional (as indicated in FIG. 2 with the shading of A4). Accordingly, individual operand processing units may have a status, such as A4 being nonfunctional; groups of the processing element 115 may have a status, such as the group 250 having a partial availability status, and the processing element 115 itself of FIG. 2 having a partial availability status. Advantageously, in requesting and examining such status information from multiple processing elements 115 of a reconfigurable processor 205, a data flow manager may use a combination of a distance, whether a physical distance or relative distance, from the processing element 115 and its respective partial availability status to select the processing element 115 as part of a subset of processing elements 115, to perform a compute operation.

Figure 3:
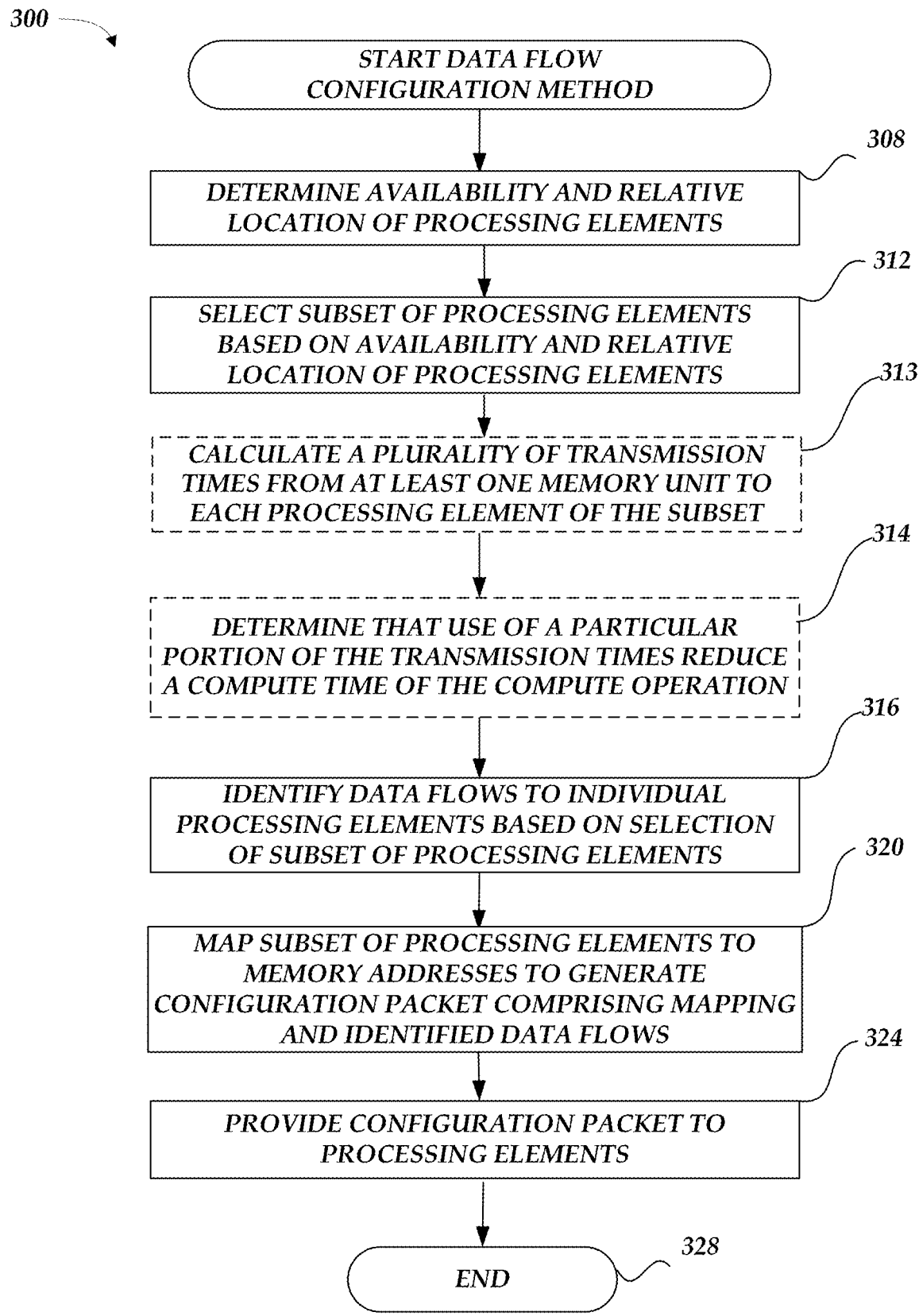
FIG. 3 is a flowchart of a method arranged in accordance with examples described herein.

FIG. 3 is a flowchart of a data flow configuration method 300 arranged in accordance with examples described herein. The method 300 may be implemented by a data flow manager, such as a data flow manager 120 of FIG. 1. The method 300 may include a block 308 that recites "determine availability and relative location of processing elements." A data flow manager 120 as implemented by a processor, such as processor 105 or 205, may obtain status information from processing elements 115. For example, the data flow manager 120 may request status information from any or all processing elements 115 to determine an availability status of each processing element 115, which may include availability of individual operand processing units. Such status information may also include the relative location of each processing element 115 in the processor itself. The relative location of each processing element 115 may be provided, in the status information, in reference to another component of a computing system (e.g., computing system 100) or in reference to a specific memory component, such as shared memory space 130 or memory unit 140b, for example.

Block 308 may be followed by block 312 that recites "select subset of processing elements based on availability and relative location of processing elements." A data flow manager 120 may select a subset of processing elements based on the obtained availability information and physical location information regarding all of the processing elements. For example, the data flow manager 120 may select a subset solely on the basis of status information, selecting only processing elements that are at least partially available. In an example, the data flow manager 120 may also select a subset solely on the basis of the relative location, e.g., a physical distance in reference to the shared memory space 130 or a memory unit 140a, 140b. In various examples, the data flow manager 120 may select a subset of processing elements based partly on the obtained availability information and based partly on the respective relative locations of the processing elements. For example, the data flow manager 120 may utilize various rules or priorities, as required for a compute operation, to determine which information to prioritize and/or use to select the subset of the processing elements.

Block 312 may be followed by optional block 313 that recites "calculate a plurality of transmission times from at least one memory unit to each processing element of the subset." In the example, the data flow manager 120 may calculate transmission times of that processing element and other processing elements to provide that certain processing result to that memory element to identify the particular data flow being from that processing element as having a reduced compute time, as compared to the compute times of potential data flows of the other routes from the other processing elements. Block 313 may be followed by optional block 314 that recites "determine that use of a particular portion of the transmission times reduce a compute time of the compute operation." In the example, as described with respect to FIG. 1, based on such transmission times, the data flow manager 120 determines that use of a particular portion of the transmission times reduce a compute time of the compute operation. Block 314 may be followed by block 316 that recites "identify data flows to individual processing elements based on selection of subset of processing elements." A data flow manager 120 may identify data flows to individual processing elements based on selection of subset of processing elements. The data flow manager 120 may identify routes for data to/from a specific processing element 115 based on the status information or the relative location information. For example, a data flow manager may route a data flow based on a processing element, which is to output a certain processing result, being relatively closer to a certain memory element (e.g., shared memory space 130), than other processing elements, where that data is to be stored/accessed. Advantageously, in identifying such a data flow, the processor 105 may perform a particular compute operation faster than conventional schemes that may rely on using fixed routes to elements of a processor to perform a compute operation.

Block 316 may be followed by block 320 that recites "map subset of processing elements to memory addresses to generate configuration packet comprising mapping and identified flows." The data flow manager 120 may map an address of each processing element of the subset to a respective memory address, e.g., a memory address of an external memory unit(s) 140a, 140b or a memory address of the shared memory space 130. In some examples, the data flow manager 120 may also generate and/or associate a set of instructions to access the memory based on the mapped addresses. For example, the set of instructions may be included in the generated configuration packet 127 or provided contemporaneously with a received configuration packet 127. In such a case, the data flow manager 120 may provide the set of instructions with the mapped addresses to respective processing elements. The processing elements may use the instructions and the mapped addresses to perform the compute operation, once instructed to execute or perform the compute operation. With the configuration packet 127 having the mapping and the identified data flows, the compute operation may be performed, advantageously, efficiently by the subset of the processing elements to generate processing results for compute operation. For example, with the data flows having been identified by the data flow manager 120, a processor or computing device utilizing the configuration packet 127 may perform compute operations flexibly—utilizing processing elements as available or processing elements that are relatively closer to certain memory units, thereby reducing the compute time of the compute operation as compared to a conventional processor that may fix data flows between certain elements of the processor or restrict certain elements to interact with particular memory units.

Block 320 may be followed by block 324 that recites "provide configuration packet to processing elements." The data flow manager 120 may provide the configuration packet to the subset of processing elements. For example, the configuration packet 127 may be provided at the start of a compute operation to allocate a portion of the processing elements to perform a portion of the compute operation efficiently and flexibly. In some examples, the configuration packet 127 may be provided before the start of a compute operation, such that the processing elements may be mapped to particular memory addresses, which may require additional time. Upon completion of the method 300 to configure data flows in a processor 105 or computing device, the processor 105 or computing device may execute the compute operation as provided by the configuration packet 127. In some examples, the processor 105 or computing device may execute the instructions provided and/or associated with configuration packet 127, as the method 400, described with reference to FIG. 4. The method 300 ends at block 328 after the block 324.

Figure 4:
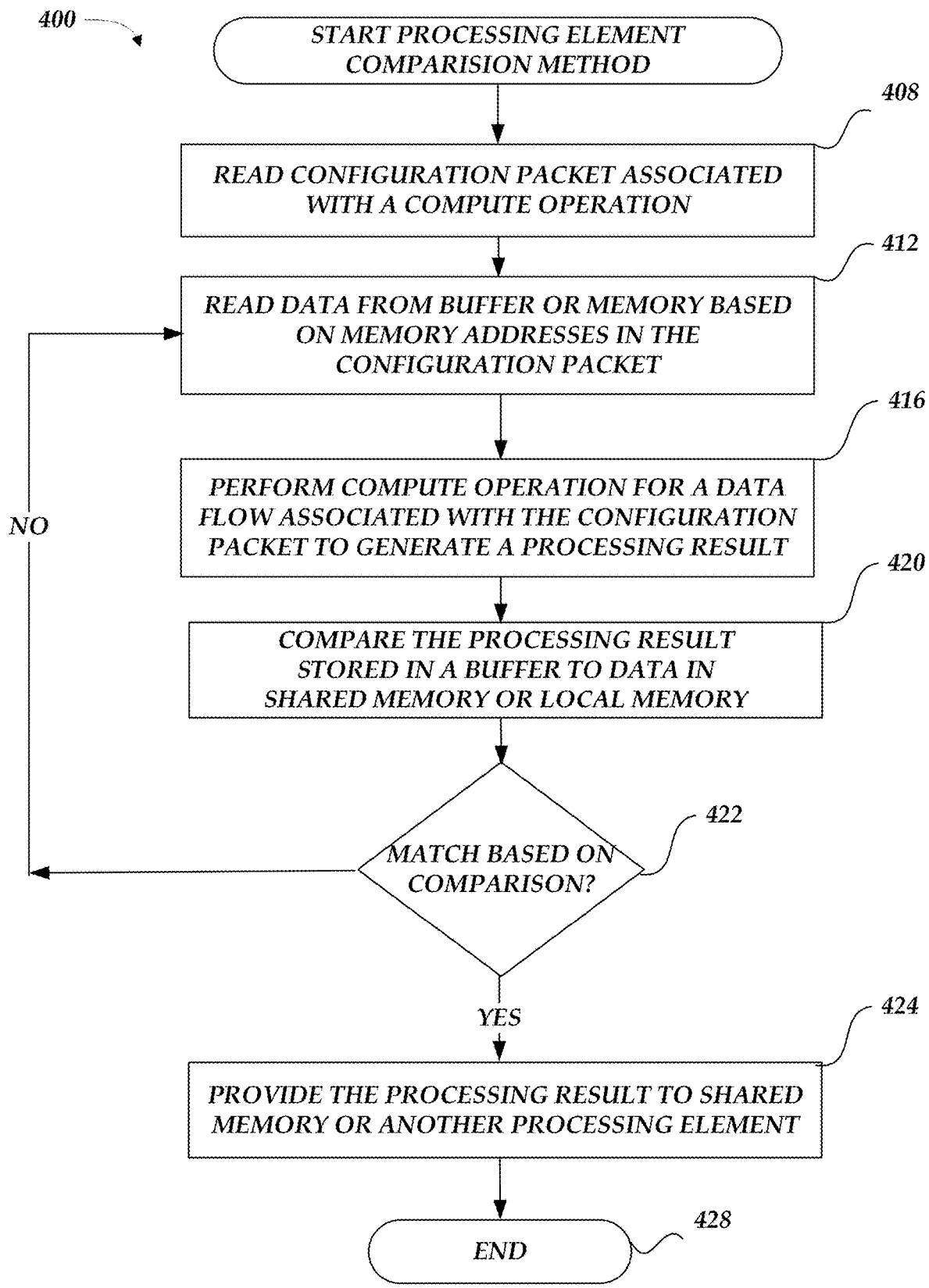
FIG. 4 is a flowchart of a method arranged in accordance with examples described herein.

FIG. 4 is a flowchart of a processing element comparison method 400 arranged in accordance with examples described herein. The method 400 may be implemented by a processing element, such as a processing element 115 of FIG. 1 or 2. The method 400 may include a block 408 that recites "read configuration packet associated with a compute operation." Once a configuration packet 127 is provided to a processing element, the processing element 115 may obtain the mapped addresses and/or an associated set of instructions, and thereby perform one or more compute operations in accordance with the configuration packet. For example, a processing element 115 may obtain mapped addresses that specify a group of operand processing units to perform a compute operation. In an example, if the groups 220, 240, which include operand processing units A1 and A3, are part of the mapped addresses, the processing element 115 may map A1 and A3 to respective memory addresses in accordance with the mapping provided in the configuration packet 127. In the example, the operand processing units A1 and A3 may be mapped to memory addresses of memory unit 140a and 140b, respectively, such that each groups 220, 240 may perform a compute operation associated with data stored at the memory addresses specified in the memory units 140a, 140b, respectively. Advantageously, because the mappings are generated based on distance, the compute operation may be performed faster r, for instance because the data flow manager 120 had determined that the operand processing unit A1 of group 220 is relatively closer to memory unit 140a than memory unit 140b and/or that the operand processing unit A3 of group 240 is relatively closer to the memory unit 140b than the memory unit 140a. For example, such a determination represents that the operand processing unit A1 of group 220 is relatively located closer to the memory unit 140a than the memory unit 140b and that the operand processing unit A3 of group 230 is relatively located closer to the memory unit 140b than the memory unit 140a.

Block 408 may be followed by block 412 that recites "read data from buffer or memory based on memory addressee in the configuration packet." In the example, one or more processing elements, to implement the compute operation, may read data from a buffer of the shared memory space 130 or a memory unit 140a, 140b based on the mapped memory addresses in the configuration packet. For example, a specific memory address of a memory cell in the memory unit 140a may be mapped to the operand processing unit A1. Accordingly, the operand processing unit A1 may access that memory cell of the memory unit 140a to read the data that is stored there. Contemporaneously, for instance, an operand processing unit B4 may read data from a mapped address of a buffer in the shared memory space to access data for a portion of the compute operation to be implemented by the operand processing unit B4. In the example, to read information associated with the mapped address of the buffer, the processing element 115 provides an instruction to the buffer that allows the operand processing unit B4 requesting the information to read the data associated with the mapped address of the buffer. For example, the data stored in the buffer may be a phoneme of human speech, when the compute operation being performed is part of a speech signal processing operation.

Block 412 may be followed by block 416 that recites "perform compute operation for a data flow associated with the configuration packet to generate a processing result." With the subset of the processing elements 115 having accessed respective data for the compute operation, the processing elements 115 may perform the compute operation for a data flow associated with the configuration packet. In performing the compute operation, one or more of the subset of processing elements may generate a processing result(s). In the example, various operand processing units may perform a respective functionality associated with that operand processing unit. For example, if the operand processing unit A1 is a multiplication processing unit, the operand processing unit A1 may multiply the data stored obtained from the memory unit 140a with an operand of A1. In an example of a speech signal processing operation, the processing result may be a component of a human speech, e.g., a phoneme. The processing elements of the subset execute the compute operation such that data flows are routed in accordance with the configuration packet 127. For example, the operand processing unit A1 and B1 may operate in conjunction to perform a portion of the compute operation on data stored at a specific memory address in the memory unit 140a. The operand processing unit B1 may generate a processing result that is outputted to the transmit (TX) buffer of the group of operand processing units 220. Such a processing result may be stored in the transmit buffer for a data flow that is to be implemented by the processing element 115. In the example, the data stored in the buffer may flow or be provided to another processing element or memory, pending the outcome of a comparison by the processing element at block 420.

Block 416 may be followed by block 420 that recites "compare the processing result stored in a buffer to data in shared memory or local memory." Having obtained processing results stored in various transmit buffers of the processing element, one or more of the processing results may be compared to data in the shared memory space 130 or a local memory, such as the memory unit 140a or 140b. In the speech signal processing operation, the processing result may be a component of human speech that is to be compared to a phoneme stored in the shared memory space 130 or the memory units 140a, 140b. The processing result may be compared to such a phoneme to determine whether there is a match. At the decision block 422, if there is a match, the flow of the method 400 proceeds along the 'YES' route to the block 424. If there is not a match, the flow of the method 400 proceeds along the 'NO' route back to the block 412, where additional compute operations may be performed by the one or more processing elements 115 after having read additional data from the buffer of shared memory space 130 or a memory unit 140a, 140b. For example, the additional data to be read may be another component of human speech to be processed by the one or more processing elements. Some processing elements 115 may perform the compute operations faster than other processing elements 115, such that some aspects of the human speech are determined faster than others. For example, particular phonemes may process faster at operand processing units requiring less compute time, thereby facilitating further compute operations on the components of human speech in an audio recording or audio input, for example.

Advantageously, in some examples with processing elements comparing various processing results to data stored in memory, compute operations may be performed faster than conventional schemes that may employ a central repository where various processing results are compared sequentially. The systems and methods described herein facilitate a flexible processor framework where processing elements may dynamically compare generated processing results to phonemes as those processing results are generated. Such processing gains allow several aspects of a compute operation to be performed faster. For example, a speech signal processing operation may be divided into various components of human speech, with each processing element comparing those respective components of human speech to a particular phoneme that is stored at a memory address. Several processing elements may work in conjunction to perform the speech signal operation faster than a conventional scheme that may parse each component of human speech, iteratively, with each phoneme. Therefore, the method 400 may facilitate processing of speech signal processing operations, without such a tedious approach, while utilizing available processing elements efficiently in the compute operation.

Block 420 may be followed by block 424 that recites "provide the processing result to shared memory or another processing element." In some examples, the generated processing results may be provided to the shared memory space 130 or other processing elements 115. For example, if the generated processing result has been identified as a particular phoneme, the generated processing result may be provided to the shared memory space 130 to be combined with other identified phonemes of the components of human speech, e.g., to be combined in a caption for an audio recording. In some examples, a generated processing result may be provided to another processing element, even when a phoneme is identified. For example, another processing element 115 may acquire two identified phonemes to compare with data stored in memory to determine whether the two phonemes, in some sequence, form a diphthong. Once determined, the identified diphthong processing result may be provided to the shared local memory 130 to be combined with the other identified phonemes of the components of human speech, e.g., to further annotate a caption for an audio recording with an indication of the diphthong. The method 400 ends at block 428 after the block 424.

The blocks included in the described example methods 300 and 400 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 5A:
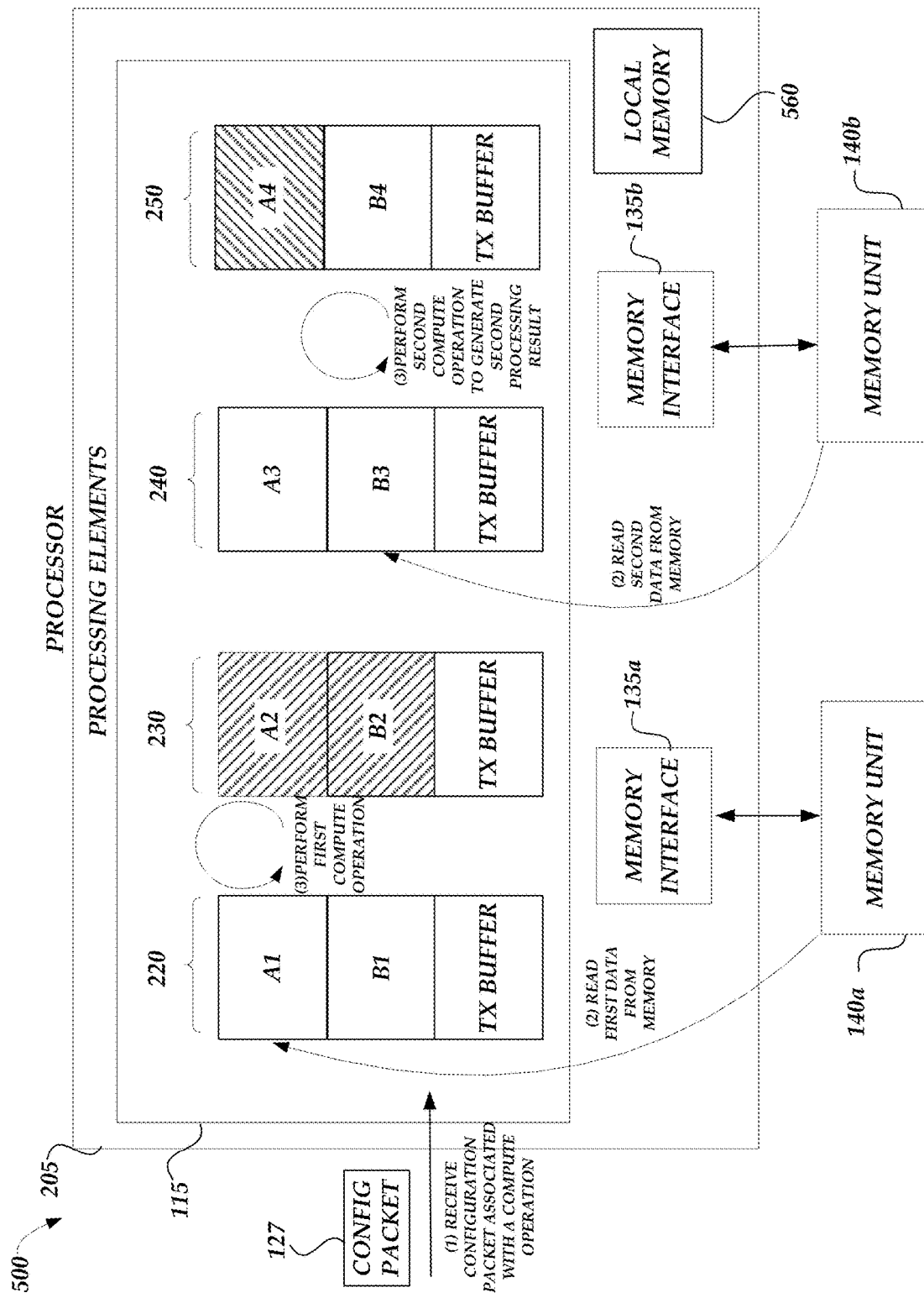
FIGS. 5A-5B are schematic illustrations of a processor being implemented in accordance with exampled described herein.
Figure 5B:
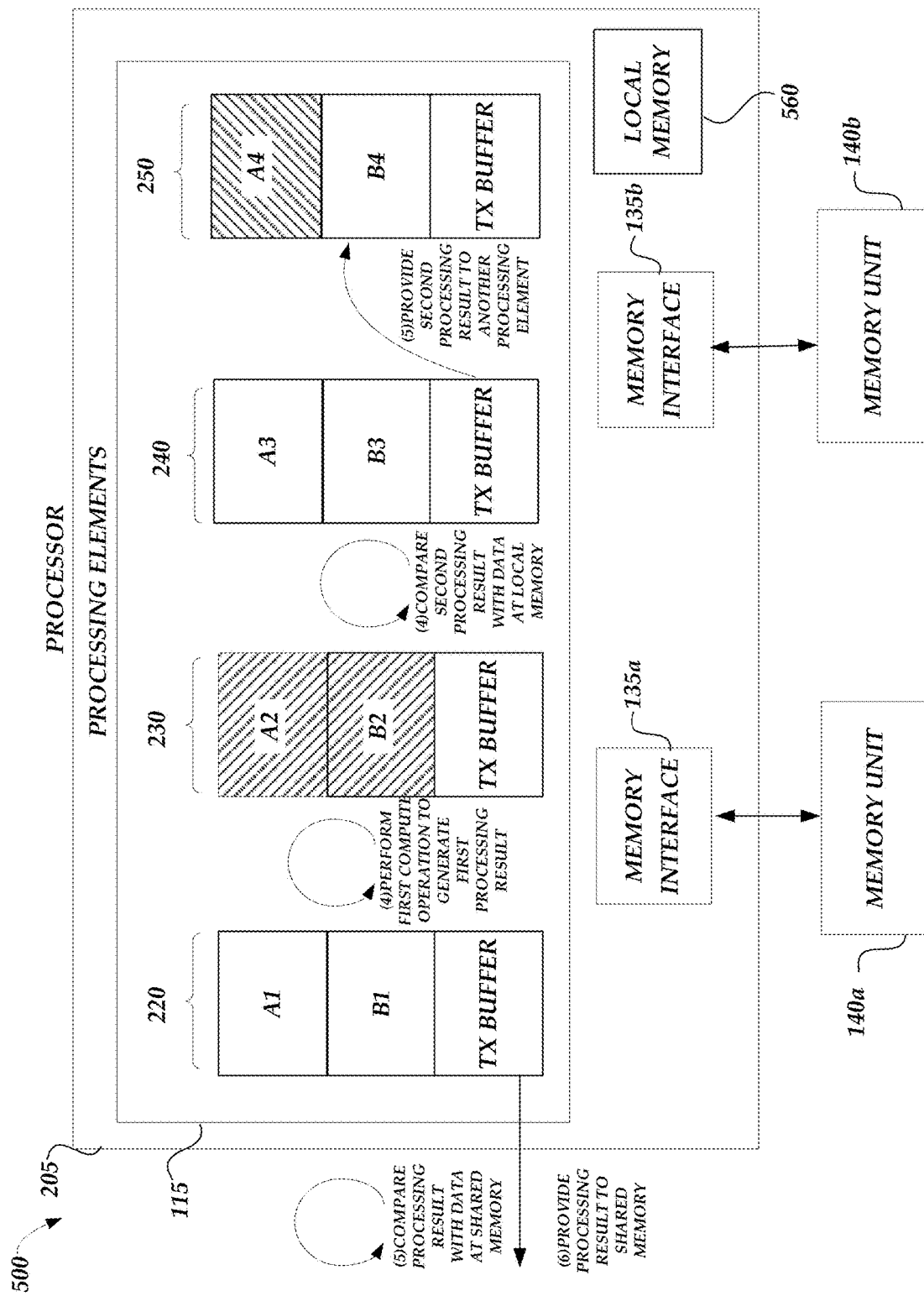

FIGS. 5A-5B are schematic illustrations of a processor 205 being implemented in accordance with exampled described herein. For example, FIGS. 5A and 5B illustrate aspects of the processor 205 implementing aspects of method 400. FIGS. 5A and 5B illustrate the implementation of method 400, in addition to other aspects that may optional in method 400.

FIG. 5A illustrates the processor 205 being implemented in accordance with examples described herein. The operations depicted in FIG. 5A may occur in three instruction periods of the processor 205 instruction pipeline, for example. An instruction period may include a plurality of clock cycles as defined by a clock signal provided by the processor 205 or via an external source, such as via a network interface. At (1) (e.g., a first instruction period), the processor 205 receives a configuration packet associated with a configuration packet. For example, the processor 205 may receive a configuration packet 127 including a mapping of addresses for the operand processing units of processing element 115 and data flows to be implemented by the processing elements 115.

At (2) (e.g., a second instruction period), first data is read by the operand processing unit A1 of group 220 from the memory unit 140a; and second data is read by the operand processing unit B3 of group 240 from the memory unit 140b. For example, data may be read from the memory units 140a, 140b as described with reference to block 412 of the method 400. At (3) (e.g., a third instruction period), the operand processing unit A1 performs a first compute operation; and the operand processing unit B3 performs a second compute operation to generate a respective second processing result. For example, compute operations may be performed by the operand processing units as described with reference to block 416 of the method 400.

Implementation by the processor 205 of two compute operations is further depicted in FIG. 5B. The operations depicted in FIG. 5B may also occur in three instruction periods of the processor 205 instruction pipeline. At (4) (e.g., a fourth instruction period), the operand processing unit B1 continues to perform the first compute operation to generate a respective first processing result; while also the processing element 115 compares the second processing result stored in the transmit buffer of group 240 with data at local memory 560. The local memory 560 may be local to a single processing element 115, for example, in an example of a speech signal processing operation, the local memory 560 may store one or more phonemes that each group 220 or 240 is comparing in the first and second compute operations.

At (5) (e.g., a fifth instruction period), the processing element 115 compares the first processing result stored in the transmit buffer of group 220 with data at local memory 560. The first processing result may be identified as a phoneme stored in local memory 560, for example. Also, at (5), the transmit buffer of the group 240 provides the second processing result to another processing element 115. For example, the second processing result may be provided to a group 250 of another processing element 115 for further processing and comparison to an additional phoneme in local memory 560, e.g., to identify a diphthong, as part of two sequential phonemes.

At (6) (e.g., a sixth instruction period), the transmit buffer of the group 220 provides the first processing result to a shared memory, e.g., a shared memory space 130. For example, having identified the first processing result as a phoneme, the first processing result may be stored in a shared memory to be combined as a caption for an audio recording, having been identified as a component of human speech. Accordingly, as described with reference to FIGS. 5A and 5B, various processing elements, including different groups of operand processing units, may process, concurrently one or more compute operations to obtain processing results that may be stored in a shared memory or provided to another processing element 115 for further processing.

Figure 6:
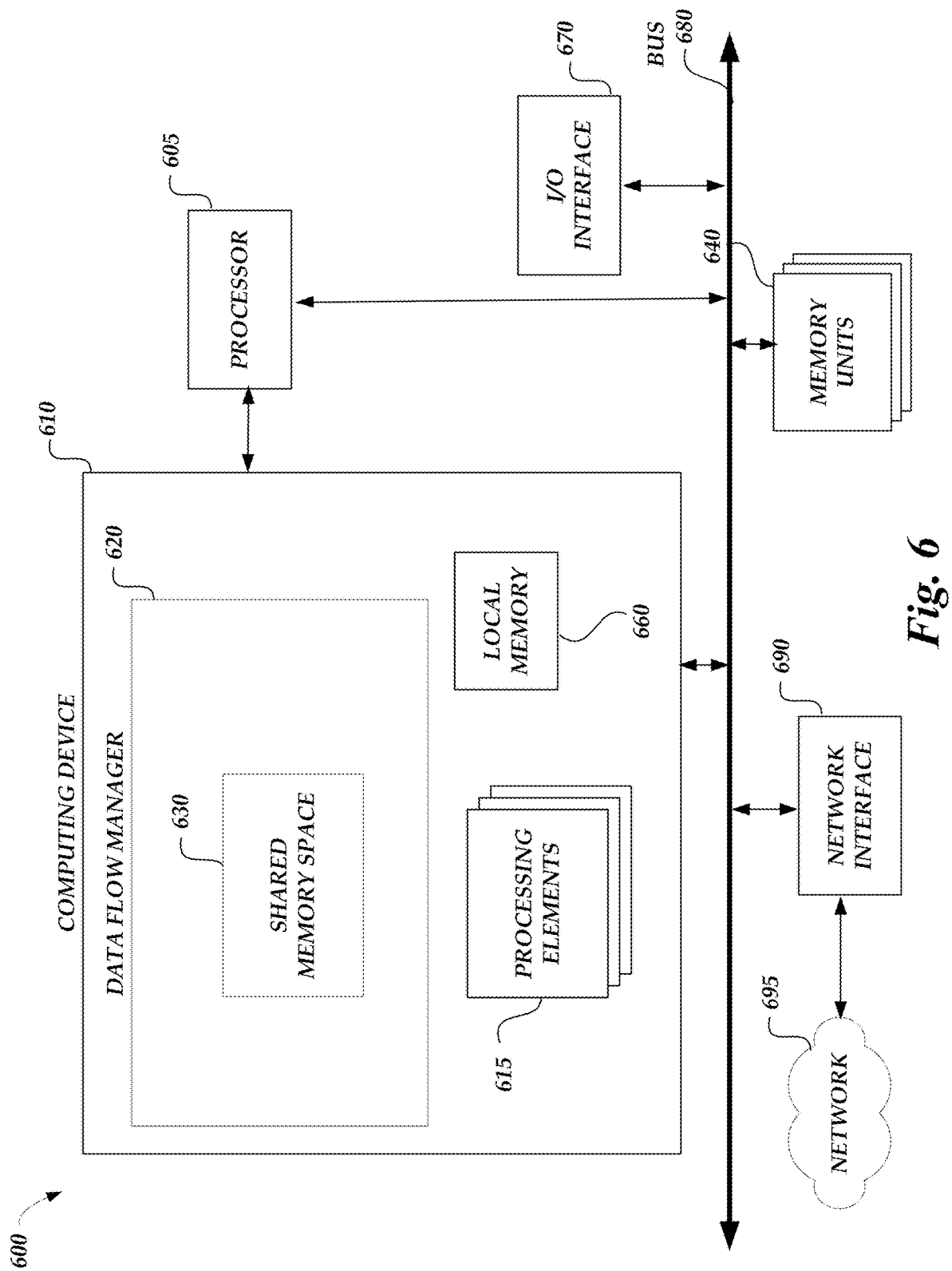
FIG. 6 is a block diagram of a computing system arranged in accordance with examples described herein.

FIG. 6 is a schematic illustration of a computing system arranged in accordance with examples described herein. The computing system 600 may operate in accordance with any embodiment described herein. The computing device may be a smartphone, a wearable electronic device, a server, a computer, an appliance, a vehicle, or any type of electronic device. The computing system 600 includes a computing device 610, a processor 605, and I/O interface 670, an internal bus 680, a network interface 690 coupled to a network 695, and memory units 640 coupled to the bus. The computing device 610 includes a data flow manager 620 having a shared memory space 630, with both operating according to the functionality described herein with respect to a data flow manager and a shared memory space. Similarly numbered elements of FIG. 6 include analogous functionality to those numbered elements of FIG. 1 or FIG. 2. For example, the memory units 640 may operate and be configured like the memory units 140a, 140b of FIG. 1. Processor 605 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide processing for system 600.

The computing device 610 also includes processing elements 615 and local memory 660, which may be a non-transitory hardware readable medium 550 including instructions, respectively, for data flow configuration and/or processing element comparison, such as implemented by methods 300 and 400, respectively. For example, the local memory may store instructions for a program that executes the method 300 or the method 400, for example. Communications between the processor 605, the I/O interface 670, and the network interface 690 are provided via a processor internal bus 680. The processor elements 615 may execute compute operations that may access the shared memory space 630 or access the memory units 640 via the internal bus 680.

Bus 680 may include one or more physical buses, communication lines/interfaces, and/or point-to-point connections, such as Peripheral Component Interconnect (PCI) bus. The I/O interface 670 can include various user interfaces including video and/or audio interfaces for the user, such as a tablet display with a microphone. Network interface 690 communications with other computing devices, such as computing system 600 or a cloud-computing server, over the network 695. For example, the network interface 690 may be a USB interface.

Figure 7:
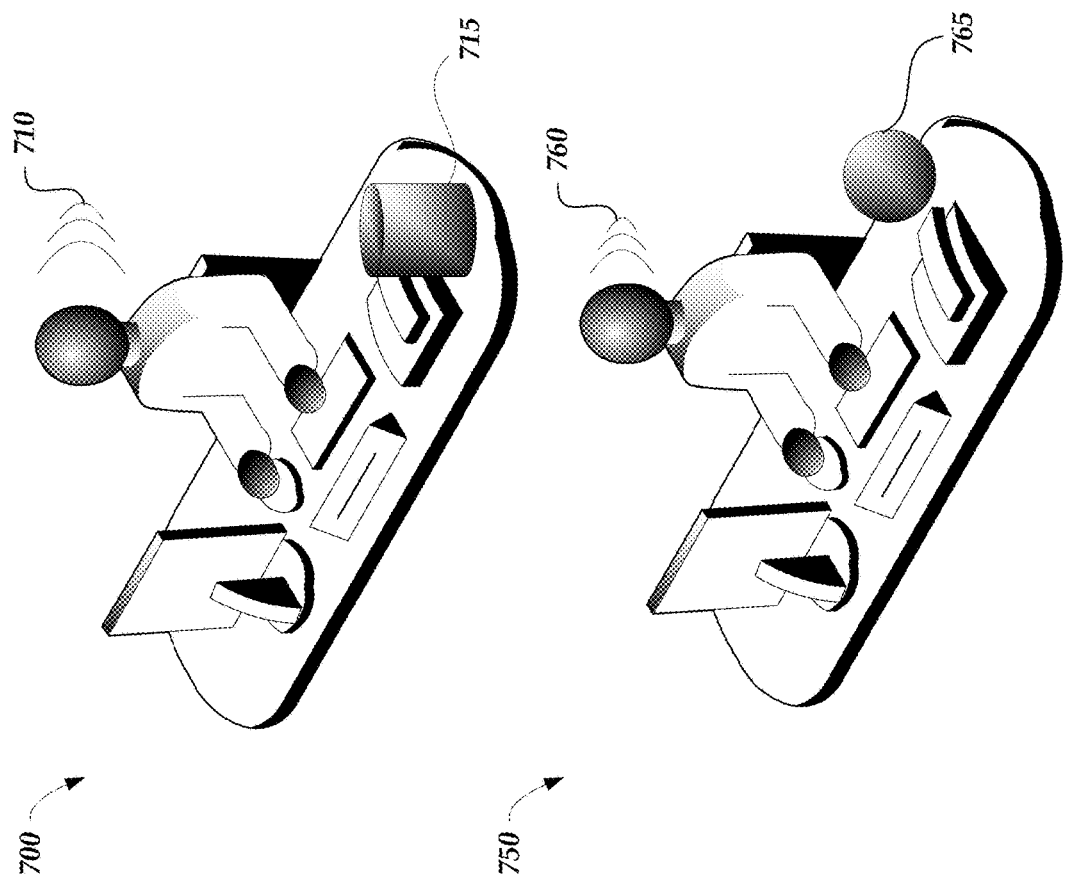
FIG. 7 illustrates examples of systems in accordance with aspects of the present disclosure.

FIG. 7 illustrates examples of systems 700 and 750 in accordance with aspects of the present disclosure. The system 700 and system 750 may respectively include computing devices 715 and 765, which may include computing system or a processor, as described herein, implementing the methods 300 and/or 400. In the example, a processor of the computing devices 715 or 765 may be the processor 105, processor 205; or the computing devices may be the computing device 610 of FIG. 6, for example.

A person in the system 700 or 750 may speak an utterance 710 or utterance 760, respectively. The computing devices 715 and 765 may detect the respective utterances 710 and 760 to process those utterances as compute operations for identifying components of human speech. Accordingly, the systems 700 and 750 may provide communication links connected to devices or "things," such as computing devices 715 or 765, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, 300, or 500 kHz, for example.

Additionally or alternatively, the IoT may include devices or things operating at different frequencies than traditional cellular technology to facilitate use of the wireless spectrum. For example, an IoT framework may allow multiple devices in system 700 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, computing devices 715 and 765 providing voice data may utilize less energy, resulting in power-efficiency and may utilize less complex signaling frameworks, such that computing devices 715 and 765 devices may transmit asynchronously on that sub-6 GHz band. Accordingly, the systems 700 and 750 may utilize the same NB-IoT band; while also utilizing less power in computing devices that may efficiently utilize available processing elements of their respective processors to process utterances 710, 760.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. In some instances, well-known wireless communication components, circuits, control signals, timing protocols, computing system components, and software operations have not been shown in detail in order to avoid unnecessarily obscuring the described embodiments of the present disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
   reading, at a processor, a configuration packet associated with a compute operation, wherein the compute operation includes a speech signal processing operation;
   reading data stored in a buffer, the data associated with at least one memory address read from the configuration packet;
   performing, at the processor, a portion of the compute operation for a data flow associated with the configuration packet to generate a processing result, wherein the processing result corresponds to a component of human speech;
   comparing the processing result to data stored in a memory; and
   determining whether the processing result matches data stored in memory to complete the data flow, wherein the data stored in memory corresponds a phoneme,
   based on the determination providing the processing result to the memory or another processor.

2. The method of claim 1, further comprising:
   storing the processing result in a transmit buffer of the processor.

3. The method of claim 1, further comprising:
   determining that the processing result does not match data stored in the memory; and
   reading additional data stored in the buffer, the data associated with another memory address from the configuration packet.

4. The method of claim 1, wherein the buffer corresponds to a buffer of shared memory, the shared memory accessible by a plurality of processors including the processor.

5. The method of claim 4, wherein reading, at the processor, the configuration packet comprises:
   identifying, in the configuration packet, at least one memory address associated with the buffer of the shared memory.

6. A system comprising:
   a plurality of computing devices in an internet of things (IOT) network, wherein at least one computing device is configured to:
      receive an utterance; and
      process the utterance as a compute operation,
   the at least one computing device comprising:
      a memory;
      a buffer; and
      a processor, the processor configured to:
         read a configuration packet associated with the compute operation;
         read data stored in the buffer, the data associated with at least one memory address read from the configuration packet;
         perform a portion of the compute operation for a data flow associated with the configuration packet to generate a processing result;
         compare the processing result to data stored in the memory; and
         based on the comparison, provide the processing result to the memory or another processor.

7. The system of claim 6, wherein the processor is further configured to:
   determine that the processing result matches data stored in memory to complete the data flow.

8. The system of claim 7, wherein the compute operation is a speech signal processing operation, the processing result corresponds to a component of human speech, and the data stored in memory corresponds a phoneme.

9. The system of claim 7, wherein the processor is further configured to:
   store the processing result in a transmit buffer of the processor.

10. The system of claim 6, wherein the processor is further configured to:
    determine that the processing result does not match data stored in the memory; and
    read additional data stored in the buffer, the data associated with another memory address from the configuration packet.

11. The system of claim 6, wherein the buffer corresponds to a buffer of shared memory, the shared memory accessible by a plurality of processors including the processor.

12. The system of claim 11, wherein reading, at the processor, the configuration packet comprises:
    identifying, in the configuration packet, at least one memory address associated with the buffer of the shared memory.

13. An apparatus comprising:
    a data flow manager comprising a shared memory;
    a memory interface, wherein the memory interface is configured to communicate with a memory unit; and
    a processor, the processor configured to:
       read a configuration packet associated with a compute operation wherein compute operation includes a speech signal processing operation;
       read data stored in a buffer, the data associated with at least one memory address read from the configuration packet;
       perform a portion of the compute operation for a data flow associated with the configuration packet to generate a processing result, wherein the processing result corresponds to a component of human speech;
       compare the processing result to data stored in a memory, wherein the memory comprises one of the shared memory or the memory unit;
       determine that the processing result matches data stored in memory to complete the data flow, wherein the data stored in memory corresponds a phoneme; and
       based on the comparison, provide the processing result to the memory or another processor.

14. The apparatus of claim 13, wherein the processor is further configured to:
    store the processing result in a transmit buffer of the processor.

15. The apparatus of claim 13, wherein the processor is further configured to:
    determine that the processing result does not match data stored in the memory; and
    read additional data stored in the buffer, the data associated with another memory address from the configuration packet.

16. The apparatus of claim 13, wherein the buffer corresponds to a buffer of the shared memory, the shared memory accessible by a plurality of processors including the processor.

* * * * *